United States Patent [19]

Councilman et al.

[11] Patent Number: 4,509,705
[45] Date of Patent: Apr. 9, 1985

[54] SURFCASTING SPINNING REEL

[75] Inventors: Richard R. Councilman, Collinsville; Steven L. Swisher; Robert L. Carpenter, both of Tulsa, all of Okla.

[73] Assignee: Brunswick Corporation, Skokie, Ill.

[21] Appl. No.: 578,876

[22] Filed: Feb. 10, 1984

[51] Int. Cl.³ .............................................. A01K 89/02
[52] U.S. Cl. ....................... 242/84.21 R; 242/84.51 A
[58] Field of Search ................... 242/84.21 R, 84.2 R, 242/211–219, 84.5 R, 84.5 A, 84.51 R, 84.51 A

[56] References Cited

U.S. PATENT DOCUMENTS

| | | | |
|---|---|---|---|
| 3,554,458 | 1/1971 | Smith | 242/84.2 G |
| 3,586,255 | 6/1971 | Monthulet | 242/84.21 R |
| 4,193,561 | 3/1980 | Stiner | 242/84.51 A |
| 4,200,248 | 4/1980 | Puryear | 242/84.51 A |
| 4,238,085 | 12/1980 | Jansson et al. | 242/84.21 R X |
| 4,249,706 | 2/1981 | Haselbauer et al. | 242/84.21 R |
| 4,291,846 | 9/1981 | Carpenter | 242/84.2 G |
| 4,466,580 | 8/1984 | Toda | 242/84.21 R |

Primary Examiner—Stuart S. Levy
Assistant Examiner—Joseph J. Hail, III
Attorney, Agent, or Firm—Wood, Dalton, Phillips, Mason, & Rowe

[57] ABSTRACT

A spinning reel is provided with a housing, a rotor, a crank, drive assembly for rotating the rotor, an anti-reverse assembly for selectively preventing reverse rotation of the rotor, a centershaft with a line spool, a front drag assembly between the spool and the centershaft and a rear drag assembly between the housing and the centershaft. A locking means is provided on the rotor for locking the spool to the rotor and for locking the rotor to the housing so that long casts can be made with the reel. A bait clicker assembly is associated with the rear drag and is provided with a plunger which, when in the "off" position, will engage a ratchet wheel on the rear drag which will lock the rear drag, clicker and centershaft against rotation. Putting the plunger in the "on" position with the anti-reverse assembly in the "on" position will disengage the ratchet wheel so that the rear drag is operative. If the pull on the line exceeds the drag setting of the rear drag, the ratchet wheel will rotate, generating an audible clicking sound indicating that line is being pulled off the reel.

20 Claims, 17 Drawing Figures

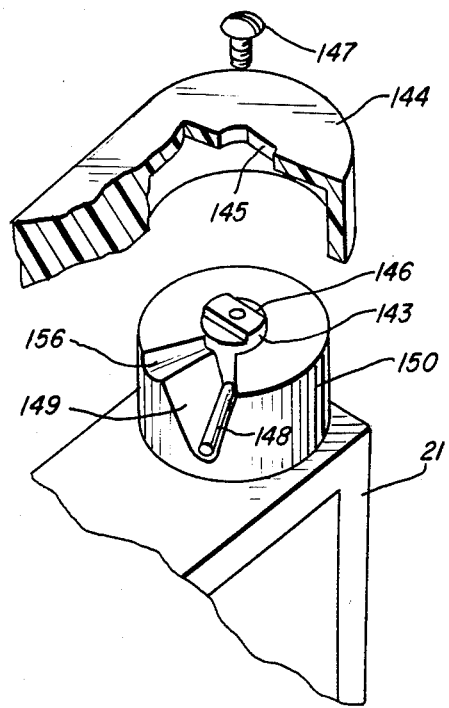
FIG. 7
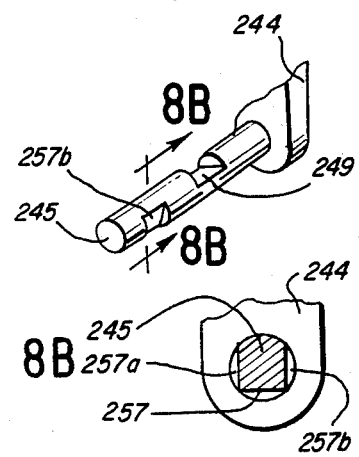
FIG. 8A
FIG. 8B
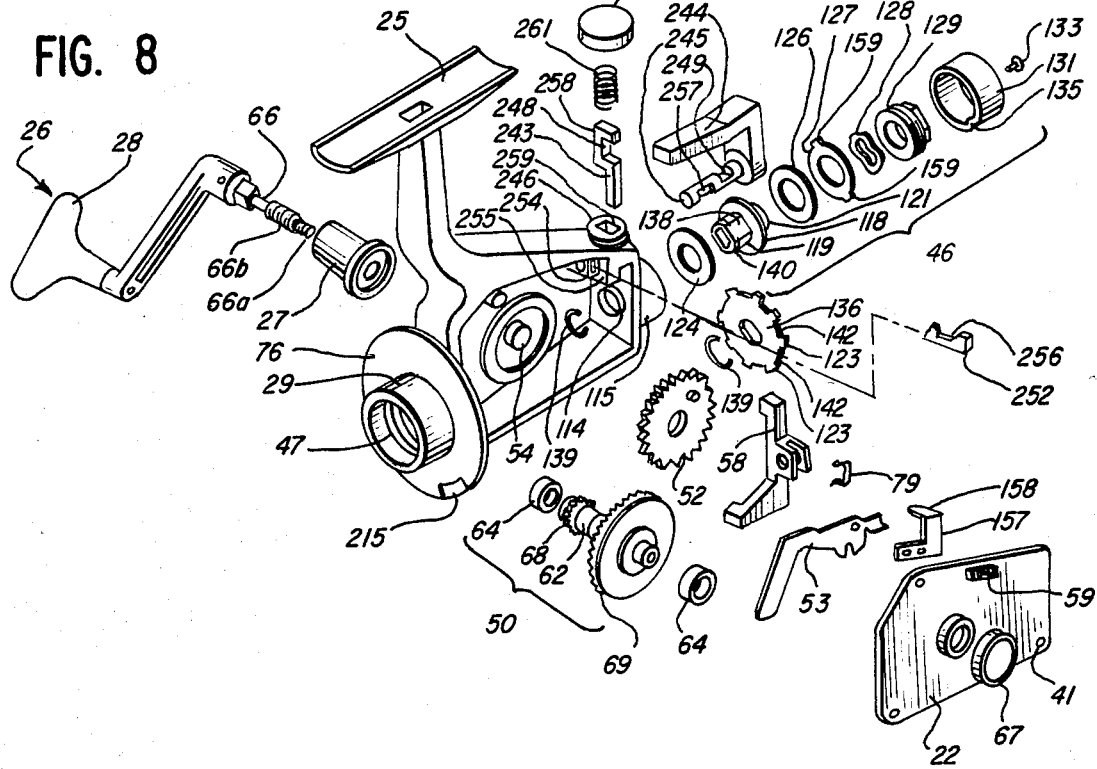
FIG. 8

SURFCASTING SPINNING REEL

BACKGROUND OF THE INVENTION

1. Field of the Invention

This invention relates to skirted style spinning reels of both the bail type and the bail-less type, and more particularly relates to a drag and selective clicker construction together with a structure for locking the rotor and spool against rotation relative to the reel housing during casting.

2. Background of the Prior Art

Spinning reels of current design either cannot be used for long casts, such as for surfcasting using heavy terminal tackle, and for fishing in strong currents or, if used, require considerable skill and preparation. For instance, to prevent line from cutting fingers by slipping the drag, thereby drawing very tight line across fingers prior to release, it was necessary to tighten the drag to the maximum. Then after the cast was completed, the drag had to be reset to the desired setting. It was also necessary to inhibit rotation of the rotor due to inertia of the crank and rotor. This was done by using rubberbands or other restraining means around the rotor and housing. Premature tripping of the bail by rotation of the rotor was also a major problem.

Current spinning reels have a single drag on the centershaft for control of the drag on the line and spool. The drag may be in the rear of the reel or in the spool. No provisions are made to allow fishing in a free spool bait click mode now available only on some rotating spool type reels.

The present invention is designed to overcome the above listed problems and problems related thereto by providing a spinning reel with improved structure that extends the range and scope of usefulness of the reel.

SUMMARY OF THE INVENTION

The invention provides a reel with a bait clicker with separate line tension control when the reel is in the bait click mode. The line tension control allows the user to set a desired tension on the line for resistance to prevent water current or tide from stripping line from the spool. The bait clicker line tension control is a rear mounted drag with limited friction capabilities. The primary drag used in the retrieve (fighting) mode of the reel is mounted in the spool on the front of the reel. The clicker drag and the retrieve drag are independent of each other except that they both operate on the centershaft. Each drag may be adjusted and/or preset without affecting the other. Normally when fishing, the desired drag setting will be set on the retrieve (spool mounted) drag with the bait clicker in the "off" mode. Once the retrieve drag is set, the bait clicker can be set to the desired line tension by placing the bait clicker in the "on" mode and adjusting the bait click drag.

The bait click drag friction is not sufficient to use as a retrieve drag. It is used for types of fishing where a tight line inhibits success. The setting of the friction resistance is determined by the effect the current or tide has on the bait. When setting the spool, the fisherman engages the bait click inhibiting mechanism (bait click "off" mode). This prevents the centershaft from rotating, thereby causing the spool mounted primary drag (retrieve drag) to be employed.

When using the bait click, the anti-reverse should be engaged to prevent rotation of the rotor due to line tension. The bait click drag is coupled directly to the centershaft which turns with the spool when the bait click is in the "on" mode.

In addition, the improved reel can be used for long casts using heavy terminal tackle by providing a locking mechanism for the rotor and spool which locks the rotor and spool together and to the housing to prevent rotation of the spool and rotor during the casting mode. The locking mechanism is indexed so that in bail-type reels the bail arm is locked in a position for convenient line pickup by a finger of the fisherman for casting.

DESCRIPTION OF THE DRAWINGS

FIG. 7 is an enlarged perspective partial broken away view of the bait click control knob exploded from mating operative parts of the bait click actuator;

FIG. 8 is an exploded perspective view of a portion of a spinning reel showing a modified form of bait click assembly;

FIG. 8(A) is a broken-away perspective view of the rod of FIG. 8 shown enlarged to better illustrate the details of the rod.

FIG. 8(B) is a cross-section view taken on line 8B—8B of FIG. 8(A);

DESCRIPTION OF BASIC STRUCTURE AND OPERATION OF FISHING REEL

Figure 1:
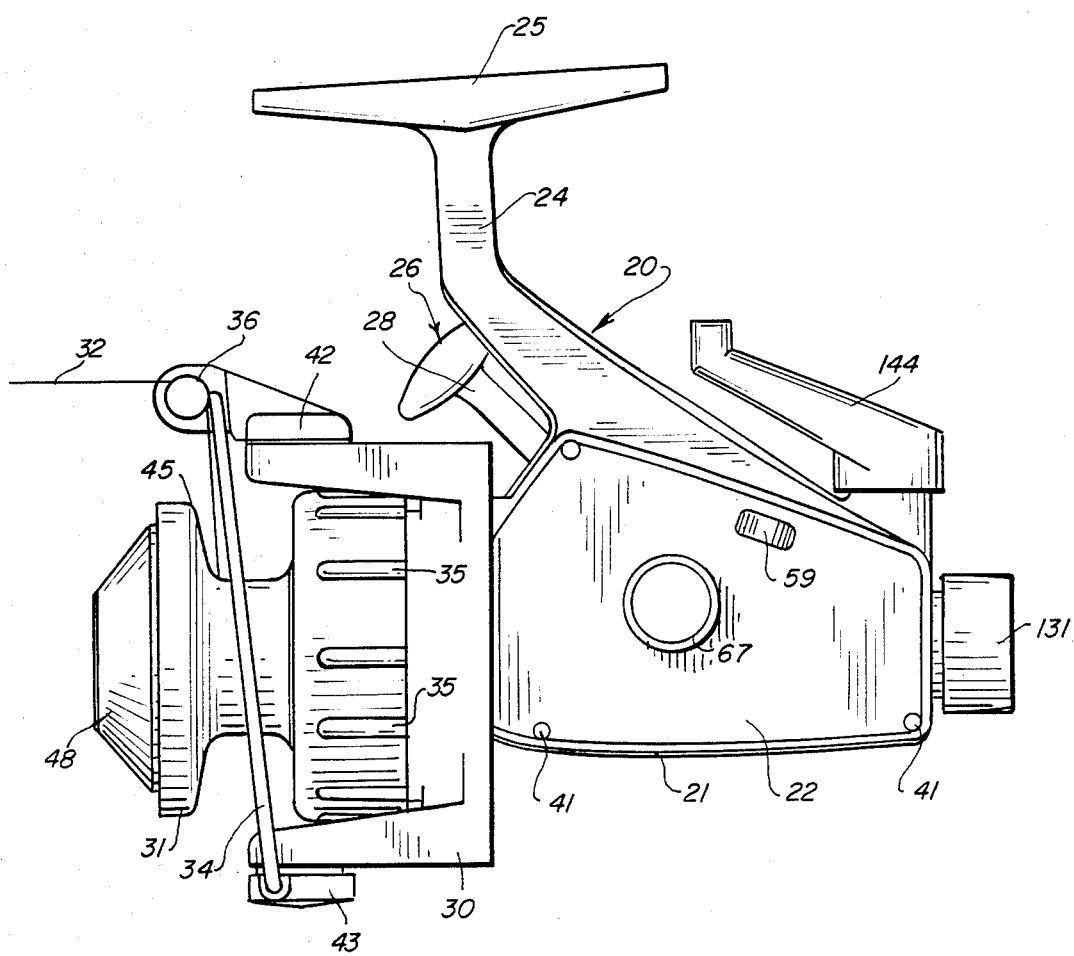
FIG. 1 is a side elevation view of a skirted style spinning reel having a manually operated bail-type line pickup and containing the invention described herein.

A spinning reel 20 (FIGS. 1 and 3) or 20a (FIG. 2) has a housing 21 which includes an integral gear case 23 (FIG. 3) over the opening of which is secured a cover 22 as by screws 41. The housing has a stem 24 which connects the housing to a shoe 25. The shoe 25 is used to attach the reel to a fishing rod. The reel includes a crank assembly 26 mounted on the housing 21 and rotatable about a crank shaft hub 27 with a rotatable winding handle 28 for use by a fisherman with his right hand for line retrieval, while the rod (not shown) is being held by the left hand. As is well known in the art, the handle 28 may be disposed on the other side of the housing 21 for accommodating the personal desires of the user.

Figure 3:
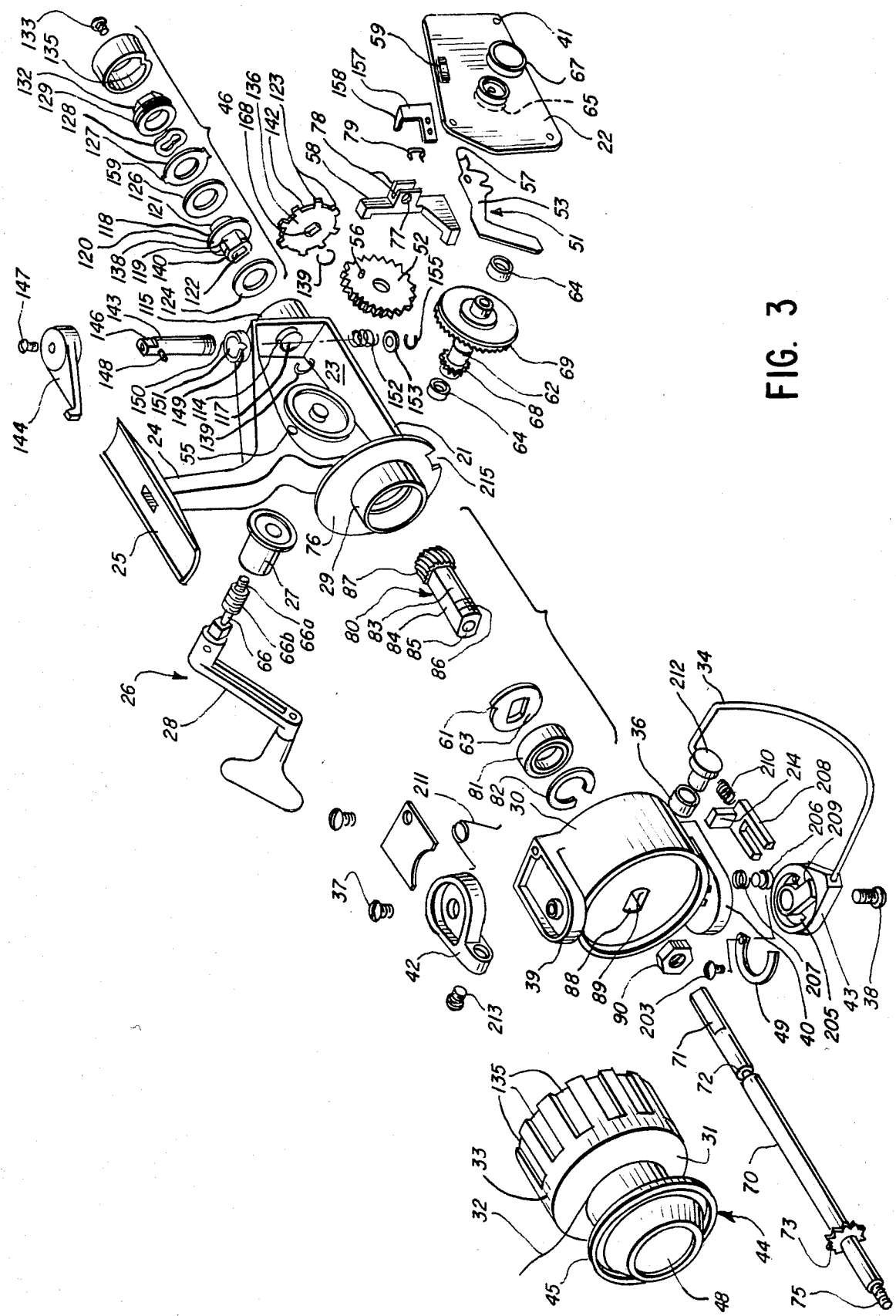
FIG. 3 is an exploded perspective view of the skirted style spinning reel of FIG. 1 containing the invention described herein.

Referring to FIG. 3 in particular, an axially mounted rotor 30 is provided and is adapted to be rotated about the axis of a spool 31 as the handle 28 is turned for line retrieval, with a fishing line 32 being captured by a bail 34 passing over a line guide 36 as shown. Bail 34 and line guide 36 are mounted on bail axle arm 42 and bail hinge arm 43, which arms 42,43 in turn are pivoted on bail ears 39 and 40 by screws 37,38, respectively. The bail ears 39,40 are integral with the rotor 30.

Figure 2:
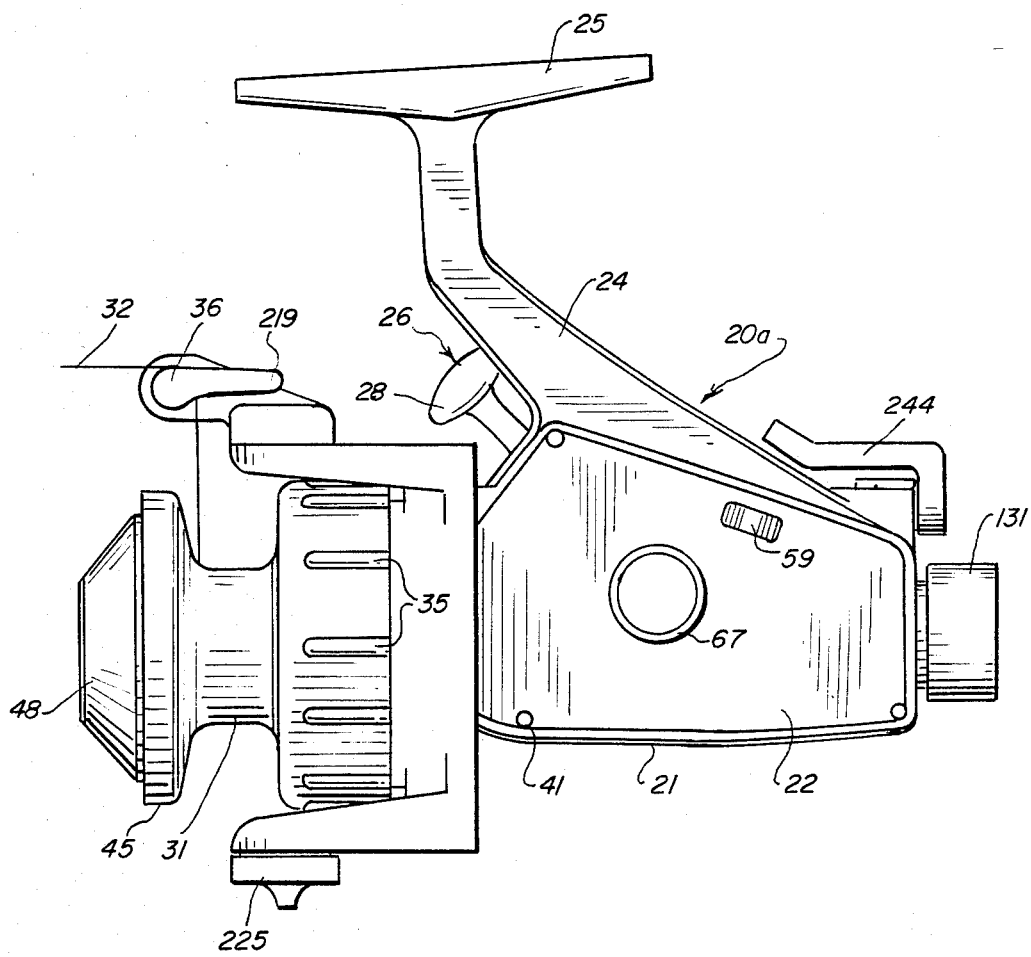
FIG. 2 is an elevation view of a skirted style spinning reel having a bail-less manual-type pickup configuration and containing a modified form of the invention.

The screws 37,38 pass through bail arm 42 and bail arm 43 and are threaded in the bail ears 39,40 and act as pivots for the bail arms 42,43. The bail 34 which is connected to the bail arms 42,43 pivots with bail arms 42,43 about the axis of the screws 37 and 38 between an open casting position and a closed retrieving position. An internal mechanism causes the line spool 31 to reciprocate axially back and forth as the rotor 30 rotates winding the line 32 about the spool 31; but as in spinning reels generally, the spool 31 does not rotate about its central core axis, except as controllably permitted by the adjustable front drag mechanism 44 and rear drag mechanism 46. Such permitted rotation of the spool may occur during line retrieval when an object on the terminal end of the line 32 exerts a force exceeding the friction setting of the drag, causing slippage and thereby preventing breaking the line 32. When the bail 34 is swung from the closed retrieve position to an open position for casting, the line 32 may freely pay out from the spool 31 over lip 45. In FIG. 1, the bail 34 is shown in the "closed", "retrieve", or "rewind" position. The line guide roller 36 is preferably rotatable, that is, it is preferably a miniature pulley to reduce the sliding friction which might otherwise cause line wear.

In paying out the line 32 over the lip 45 of the forward flange of the line spool 31 during casting, the fisherman using an open face spinning reel is obligated to use his finger to snub the line and arrest its pay out, since the normal line drag provisions are not desired to function unless the reel is in the rewind or line retrieval mode of operation.

In the overall arrangement of the reel the cover plate 22 is secured to the gear case 23 by screws 41. Inside the gear case 23 is a gear assembly 50 that is rotatable by rotating the handle 28 about the hub 27. The gear assembly 50, which includes the crank gear 69 and the oscillator pinion gear 68 integrally formed on or affixed on the tubular shaft 62, includes an oscillator gear 52 meshing with gear 68 and is rotatably mounted on stub shaft 54, which shaft 54 may be part of the interior of the gear case 23 or secured separately thereto. Gear 52 has a projecting lug 56 that fits into a groove (not shown) in oscillator slider 58. Rotation of the gear 52 causes the slider 58 to slide forward and backward. Crank shaft gear assembly 50 has the tubular shaft 62 journal mounted in bearings 64 in bores (not shown) in gear case 23 and in a flange 65 on the inside of the cover plate 22. The shaft 62 has an internal right hand thread that mates with a right hand thread 66a of shaft 66 on the crank assembly 26 on one side and a left hand thread that mates with left hand thread 66b when the shaft is placed on the opposite side of the reel. This dual threaded system enables the handle 28 on the reel to be cranked either with the right hand or with the left hand, depending on the side on which handle 28 is mounted. The open end of the shaft 62 (the end in which the shaft 66 is not inserted) is closed off by inserting screw cap 67 on the end of the shaft either exterior of the cover 22 or exterior of the closed side of the gear case 23.

A pinion gear assembly 80 is rotatably journal mounted in bearing 81 that is mounted in the collar 29 on flange 76 of housing 21 and secured therein by bearing retainer 82 which fits into groove 47 in the collar 29. The assembly 80 has a forward shaft portion 83 with oppositely spaced flats 84 thereon, a central bore 85, a forward threaded portion 86 and a pinion gear 87 on the opposite end portion. The crank gear 69 on shaft 62 engages pinion gear 87 causing the pinion gear assembly 80 to rotate when the crank handle is rotated.

A centershaft 70 has a back or rear splined portion 71, undercut groove 72, an intermediate flange or stop 73, and a front threaded portion 75. The shaft 70 slip fits through the central bore 85 in shaft 83 and extends into the gear case 23. The shaft 70 also fits through the aligned holes 77 in parallel plates 78 in oscillator slider 58. Special clip 79 fits between the plates 78 and snaps into groove 72 in shaft 70 locking the shaft 70 to the slider 58. Thus, when the slider 58 oscillates back and forth the shaft 70 also moves back and forth with respect to the forward flange 76 of the housing 20.

The rotor 30 is mounted on the forward threaded portion 86 of assembly 80. The hole 88 in rotor 30 receives the shaft 83 with the flats 84 mating with the flats 89 of the hole 88. The nut 90 is tightened on the threaded portion 86 to secure the assembly 80 to the rotor 30. The spool 31 fits over the end of shaft 70 and bears against stop 73 with the spool retainer, front drag assembly 44 and drag knob 48 fastened on thread 75 on the centershaft 70. Thus, as the handle 28 turns the crank shaft 66, the gear assembly 50 causes the pinion assembly 80 to rotate which in turn causes the rotor 30 to rotate. At the same time rotation of gear 52 by gear 68 on gear assembly 50 causes the slider 58 to reciprocate back and forth, which causes the centershaft 70 to oscillate back and forth so that line 32 can be wound during the retrieve mode in an orderly and uniform fashion on spool 31. The front drag assembly 44 operates between the drag knob 48 and the spool 31 to apply drag to the spool 31.

Figure 11:
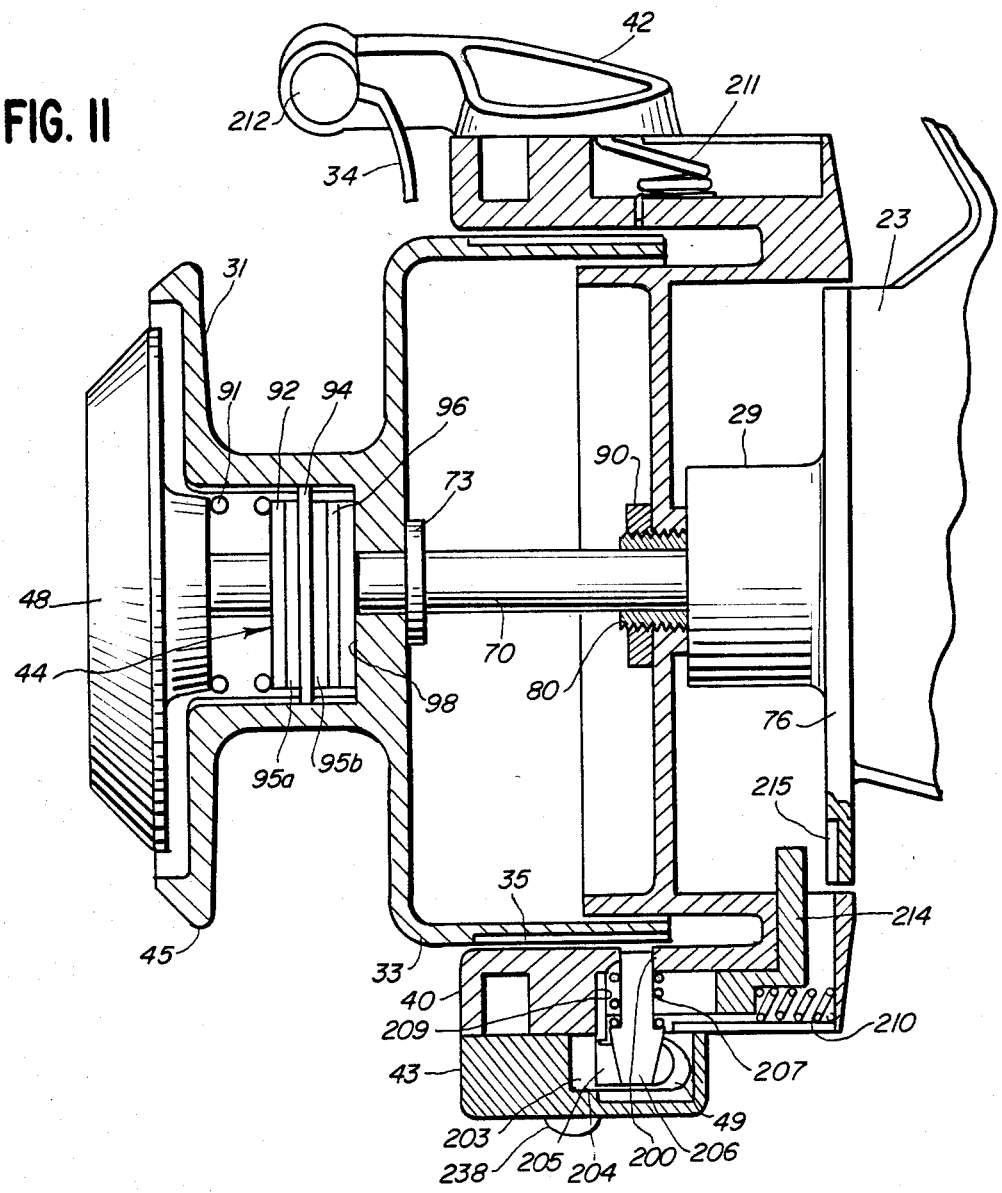
FIG. 11 is a partial cross-section view taken through the skirted style bail-type of spinning reel of FIG. 1 and showing a spool and rotor lock arrangement of the type illustrated on the left-hand portion of FIG. 3.

The front drag assembly 44 is a conventional type such as is shown in FIG. 11 wherein the knob 48 is threaded on the shaft 70 and compresses against a spring 91 which bears against a metal stationary washer 92, which is keyed to the centershaft 70, against a free-floating friction washer 95a; against a washer 93 keyed by keys 94 to the spool 31, against friction washer 95b, against a second stationary washer 96 keyed to the centershaft, and against a friction washer 97 bearing against a friction surface 98 in the spool. The spring 91 urges the knob 48 away from the spool which urging acts through the centershaft 70 to pull the flange or stop 73 against the back side of the spool. Turning the knob 48 on the centershaft adjusts the drag on the spool 31. When the line 32 pulls on the spool 31 by an amount exceeding the drag setting of drag 44, the spool will rotate relative to the centershaft 70.

An anti-reverse self-centering structure 51 is provided in the gear case 23 and includes a pawl 53 pivoted on the post 55 in the gear case 23 with an actuating cam 57 on one end of the pawl in engaging alignment with a slide actuator button 59 on the cover plate 22. The pawl 53 selectively engages the one way tooth 61 on the ratchet 63 which ratchet is keyed on the flats 84 on the pinion gear assembly 80. With the button 59 on the cover 22 in the "on" position, the pawl 53 is pivoted into contact with the tooth 61 on ratchet 63 to prevent reverse rotation of the rotor 30 and to self-center the rotor relative to the housing. When the button 59 is in the "off" position the rotor can rotate in either direction. The tooth 61 on the ratchet 63 is oriented such that engagement of the pawl 53 with the tooth aligns the bail ears 39,40 and bail arms 42,43 along an axis parallel with the axis of the stem 24.

DESCRIPTION OF THE PREFERRED EMBODIMENT

A bait clicker 100 is provided with the associated line tension control or rear bait click drag assembly 46, which rear bait click drag assembly is operative when the bait clicker is in the "on" mode. FIG. 3 is an exploded view of the reel of FIG. 1 showing the parts used in one preferred form of the invention. FIG. 8 is an exploded view of the invention in a second preferred form with an alternative method of actuation or control of the bait clicker.

As shown in FIGS. 3–7, a drag boss 115 is provided on the rear end of the housing 21 and has a concentric drag bore 116 therein which bore is in concentric alignment with a bore 117 through the rear wall of the housing 21. A collar 114 is formed on the rear wall around the bore 117 and extends into the gear case 23. The centershaft 70 has the splined rear portion 71 extending through the collar 114, bore 117 and into the bore 116 in the boss 115. The rear bait click drag 46 is assembled in the drag bore 116 of the drag boss 115. The surface of the collar 114 and bore 117 is the bearing surface which radially supports the bait click drag driver 118. The drag driver 118 is comprised of a driver boss 119, a flange 120 and a pilot boss 121. The driver boss 119 has internal flats or splines 122 (FIG. 3) which flats 122 mate with the flats or splines 71 on the centershaft 70. A friction washer 124 (FIGS. 3,4) is located between the flange 120 and the housing wall drag surface 125 with the driver boss 119 projecting through the bore 117 and collar 114 and having the outer end portion of the driver boss extending into the gear case 23. A second friction washer 126 is radially positioned on the pilot boss 121 on the outer side of the flange 120. The stationary drag washer 127 encircles the pilot boss 121 and is restrained from rotating by engagement of its radially opposed lugs 159 in the radially opposed keyways 137 on the internal bore 116 of the drag boss 115. A spring washer 128 encircles the pilot boss 121 and applies pressure to the friction washers 124,126, which pressure is varied by rotation of the threaded adjustment sleeve 129 which mates with internal threads 130 on boss 115. A polygon or splined boss 132 on the adjustment sleeve 129 mates an internal polygon or spline 141 on drag knob 131. Attachment of the drag knob 131 to the sleeve 129 is by a drag knob retainer screw 133. Rotation of the drag knob 131 is limited to one turn, to prevent unintentional removal. The limited rotation is provided by a tang 134 on the periphery of the boss 115, which interrupts rotation by interference with a key 135 on the interior of the flange on drag knob 131.

A bait clicker ratchet wheel 136 is attached to the portion of the driver boss 119 extending into the gear case 23 by mating an internal spline 168 on the clicker ratchet 136 with the external spline 138 on driver boss 119. A retainer ring 139 seats in a retainer groove 140 in driver boss 119 to retain the bait clicker ratchet 136 on the drive boss 119. The collar 114 on the inside wall of the housing surrounding the bore 117 holds the ratchet 136 in a preselected location on the driver boss 119.

In FIGS. 1, 3, 4, 5, 6 and 7, one configuration of an apparatus for inhibiting and releasing the bait clicker drag 46 is shown. Inhibiting rotation of the bait clicker drag 46 is provided when the bait clicker is in the "off" mode. Broadly stated, to inhibit the bait clicker, equally spaced grooves 142 are provided in the peripheral edge of ratchet 136 to define spaced teeth 123, which grooves and teeth are engaged by a plunger bolt 143 extending radially of the ratchet wheel 136 in a pilot hole 151 in the upstanding circular boss 150 on the housing 21. This prevents rotation of the ratchet wheel 136, driver 118 and centershaft 70.

Figure 4:
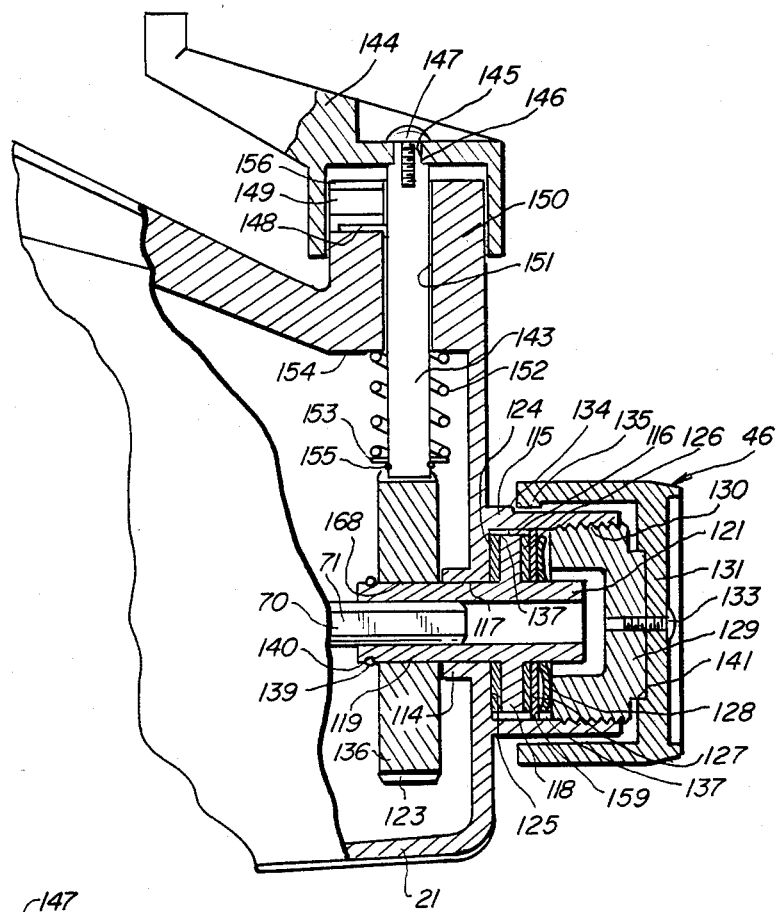
FIG. 4, is a partial cut-away side view of the skirted style spinning reel showing one form of the bait click actuator and a rear mounted drag assembly, both shown in section.
Figure 5:
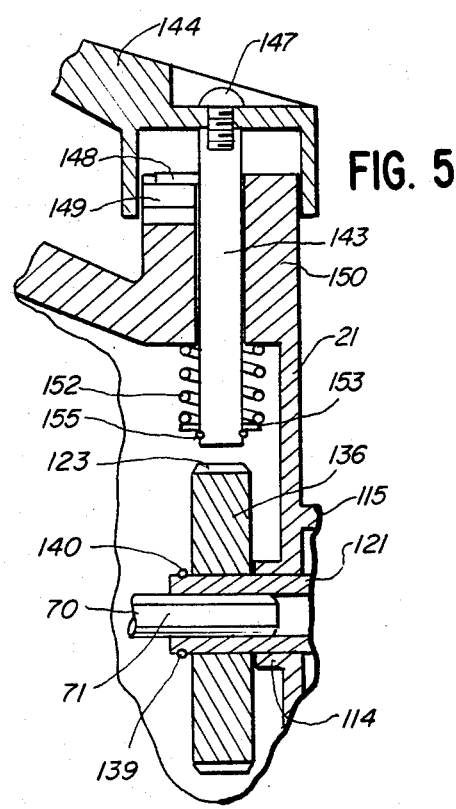
FIG. 5 is a broken away side view of the bait click actuator in a disengaged position with the bait click in the "ON" mode.
Figure 6:
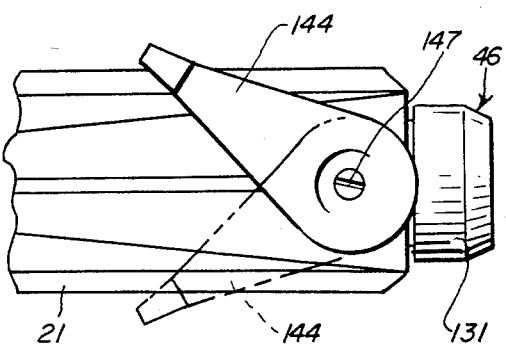
FIG. 6 is a top plan view of a bait click control knob mounted on a spinning reel.

FIG. 4 shows the bait clicker 100 in the "off" mode. FIGS. 5 and 6 show the bait clicker in the "on" mode. Engagement of the plunger bolt 143 in the grooves 142 against a tooth 123 is accomplished by rotating the bait clicker control knob 144 between an "off" position and an "on" position. The bait clicker control knob 144 is attached to the plunger 143 by a spline 145 on the clicker control knob 144 which mates with an external spline 146 on the plunger 143 with the two retained together by a screw 147. A cam follower pin 148 forms an important part of the operation of the bait clicker control.

More specifically, a cam surface 149, best shown in FIG. 7, is formed in the boss 150 on the upper surface of the housing 21. The boss 150 is concentric with the pilot hole 151, which hole is in alignment with the center line of the centershaft 70 and clicker ratchet 136. A spring 152 imposes a force on the plunger 143 by exerting pressure between a shoulder 154 surrounding the boss 150 and a retainer washer 153 held on the plunger by a clip 155. The spring 152 urges the end of the plunger 143 into one of the grooves 142 on the ratchet 136 whereby the ratchet 136 and centershaft 70 are held against rotation. To disengage the plunger bolt 143 from the ratchet 136 the actuator knob 144 is rotated clockwise from the dotted line position to the solid line position of FIG. 6 which will cause the cam follower pin 148 on the plunger 143 to ride up the cam surface 149 on the boss 150, bringing the plunger 143 with it along a linear path. The cam follower pin 148 will seat in a detent or dwell 156 in the upper part of the cam surface 149. With the pin 148 in the dwell 156 the plunger 143 will be held retracted from the ratchet wheel 136 whereby the ratchet wheel and centershaft 70 will be free to turn provided sufficient pull is put on the line to overcome the drag set by the front drag assembly 44 and the rear drag assembly 46. When the plunger 143 is seated in a groove 142 on the ratchet 136, the cam follower pin 148 will be spaced slightly from the cam surface 149 so as to assure proper and full seating of the plunger against the ratchet wheel. The extent of rotational travel of the knob 144 is approximately 60°, starting with the knob at approximately a 30° angle on one side of the center line to a like position on the other side of the center line. It is to be understood that the initial and final location of the knob 144 relative to the housing is a matter of design choice.

A bait click spring 157 is securely attached to the inside of the side plate 22. When the plate 22 is affixed to the housing by screws 41, the free end 158 of the spring 157 is in constant engagement with the grooves 142 in the ratchet 136. When the bait clicker is in the "on" mode, the anti-reverse button 59 should be in the "on" position causing the anti-reverse pawl 51 to engage the anti-reverse ratchet 63, thus preventing reverse rotation of the rotor 30. In the bait click "on" mode the plunger 143 is in the retracted position allowing rotation of the bait click ratchet wheel 136 when sufficient line tension is applied to the spool and centershaft to overcome the frictional resistance of the rear drag assembly 46, the bait click spring 157 is then intermittently engaged by the teeth 123 upon rotation of the drag click ratchet wheel 136 causing an audible signal indicating that the spool 31 is being rotated and line is being pulled from the spool.

In an alternate configuration as shown in FIGS. 2, 8, 9 and 10, the bait clicker drag 46 with all its components including the ratchet 136 are identical to the previous configuration. The difference being a different structure for engagement and disengagement of the clicker plunger 243, which plunger in FIGS. 1, 3–7 was identified as 143.

Figure 9:
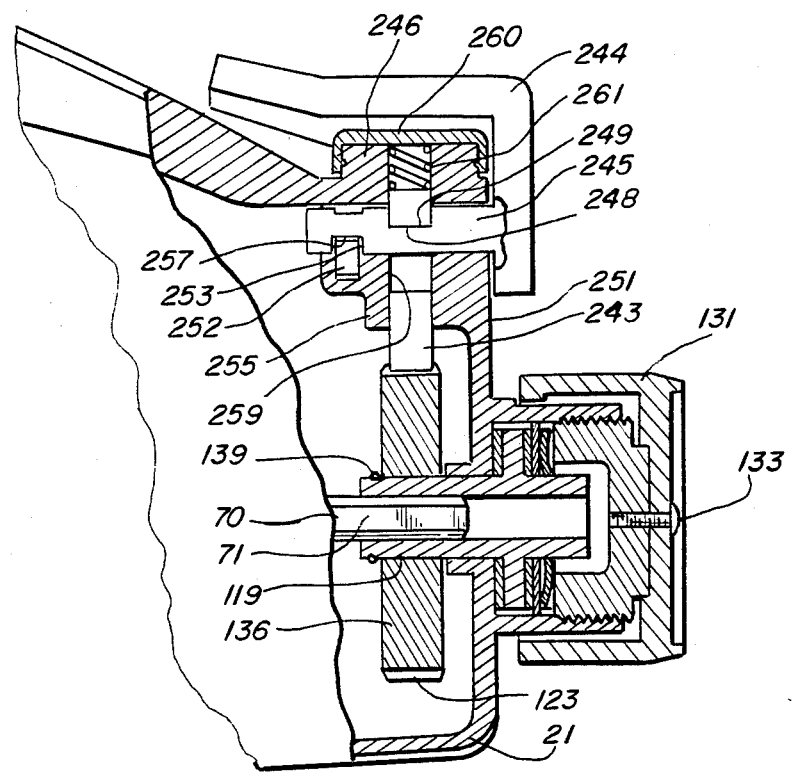
FIG. 9 is a partial cutaway section view of the spinning reel shown in FIG. 8 and illustrating the modified form of bait click assembly.
Figure 10:
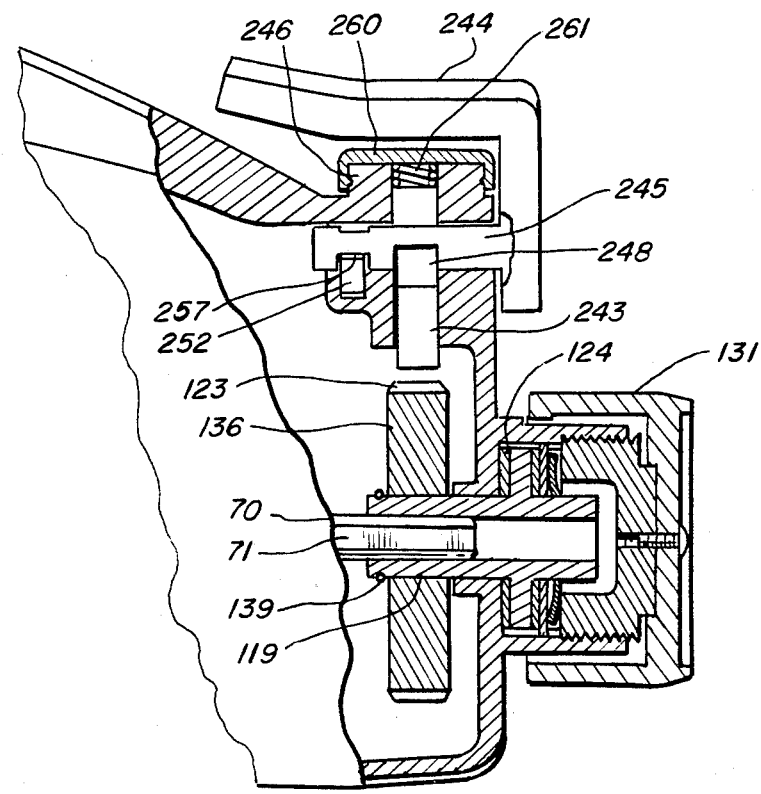
FIG 10 is a broken-away section view of the bait click assembly of FIG. 8 in a disengaged or in the "ON" mode.

FIG. 9 shows the bait clicker in the "off" mode while FIG. 10 shows the bait clicker in the "on" mode. A bait clicker control knob 244 is connected through a tubular rod 245 with a cam 249 engaging a cam surface 248 on plunger 243 which plunger engages the grooves 142 on the periphery of the ratchet wheel 136. The rod 245 with the cam 249 lies along an axis that is parallel to the axis of the centershaft 70. The control knob 244 is parallel to and is connected to the rod 245 so that the control knob 244 may be swung in a circular arc about the axis of the rod 245 with the rod 245 seated in an opening 250 extending into the housing 22 from the rear wall 251 thereof. The rod 245 is held in the opening 250 by a retaining clip 252 which engages in groove 253 in the rod 245. The clip 252 slides into a slot 254 in the boss 255 and has a hairspring shaped portion 256 which engages with a flat 257 in the groove 253 in the rod 245 to hold the knob 244 centered on the housing 21, which is the position shown in FIG. 9 and is the "off" position of the bait clicker. The groove 253 has two additional flats 257a and 257b each located 90° from flat 257 for a purpose to be described hereinafter.

The plunger 243 has an offset portion 258 which defines the cam surface 248 and engages the cam surface 249 on the rod 245. The plunger 243 moves in opening 259 through bosses 246 and 255 which opening is transverse to and intersects with the opening 250 in the rear wall of the housing. A spring 261 is seated in the opening 259 and bears against the end of plunger 243. A retainer cap 260 snaps over the end of boss 246 and retains the spring 261 within the opening 259 and depresses the spring against the end of the plunger 243. The flat 257 in the groove 253 in the rod 245 is positioned in a way what when engaged by the portion 256 of the clip 252 will hold the knob 244 centered on the housing with the plunger 243 engaging one of the grooves 142 on ratchet wheel 136 so that the centershaft 70 cannot rotate and the bait clicker is in the "off" position.

Placing the anti-reverse button 59 in the "on" position to lock up rotation of the rotor 30 and turning the knob 244 either clockwise or counterclockwise from its centered "off" position will rotate the rod 245 causing the cam 249 to raise the plunger 243 and depress spring 261. When the knob is fully clockwise or fully counterclockwise against its limiting detents the portion 256 of clip 252 will engage one or the other flats 257a or 257b in the groove 253 retaining the knob and plunger in the "on" position with the plunger 243 raised out of the grooves in ratchet wheel 136. The ratchet 136 and shaft 70 will now be free to rotate with the spool 31 when sufficient pull is placed on the line to overcome the drag setting of the rear drag 46. The bait clicker spring 157 in contact with the ratchet wheel will click each time a tooth 123 on the rotating ratchet wheel passes the spring 157 as the ratchet wheel is being rotated to signal that the line is being pulled from the spool. The ability to pivot the knob 244 clockwise or counterclockwise provides a unique convenience whereby each operator can decide for himself which direction is more convenient for his tastes. It also accommodates for left and right hand users without special settings.

Another feature of the invention is in the spool 31 and rotor lock. This feature eliminates the serious problems encountered in attempting long casts as in surfcasting as was described hereinbefore.

Two alternatives are shown. FIGS. 1, 3, 11 and 12 show the invention employed in a manually operated bail-type line pickup. FIGS. 2, 13, 14 and 15 show the invention in a bail-less manual type pickup configuration.

The front drag assembly 44 is a standard state of the art spool contained drag. The spool 31 may be retained on the shaft 70 by the drag adjustment knob 48 or by a push button (pop-off) spool retainer (not shown). The spool 31 is the skirted type with a skirt 33 overlapping the rotor 30 and having longitudinal peripherally spaced apart slots 35 in the outer periphery thereof.

Figure 12:
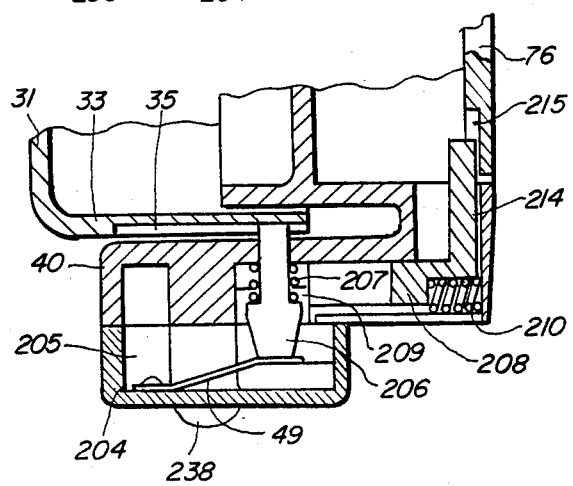
FIG. 12 is a partial cross-section view of the spool and rotor lock of FIG. 11 with the rotor lock in the casting mode.
Figures 14, 15:
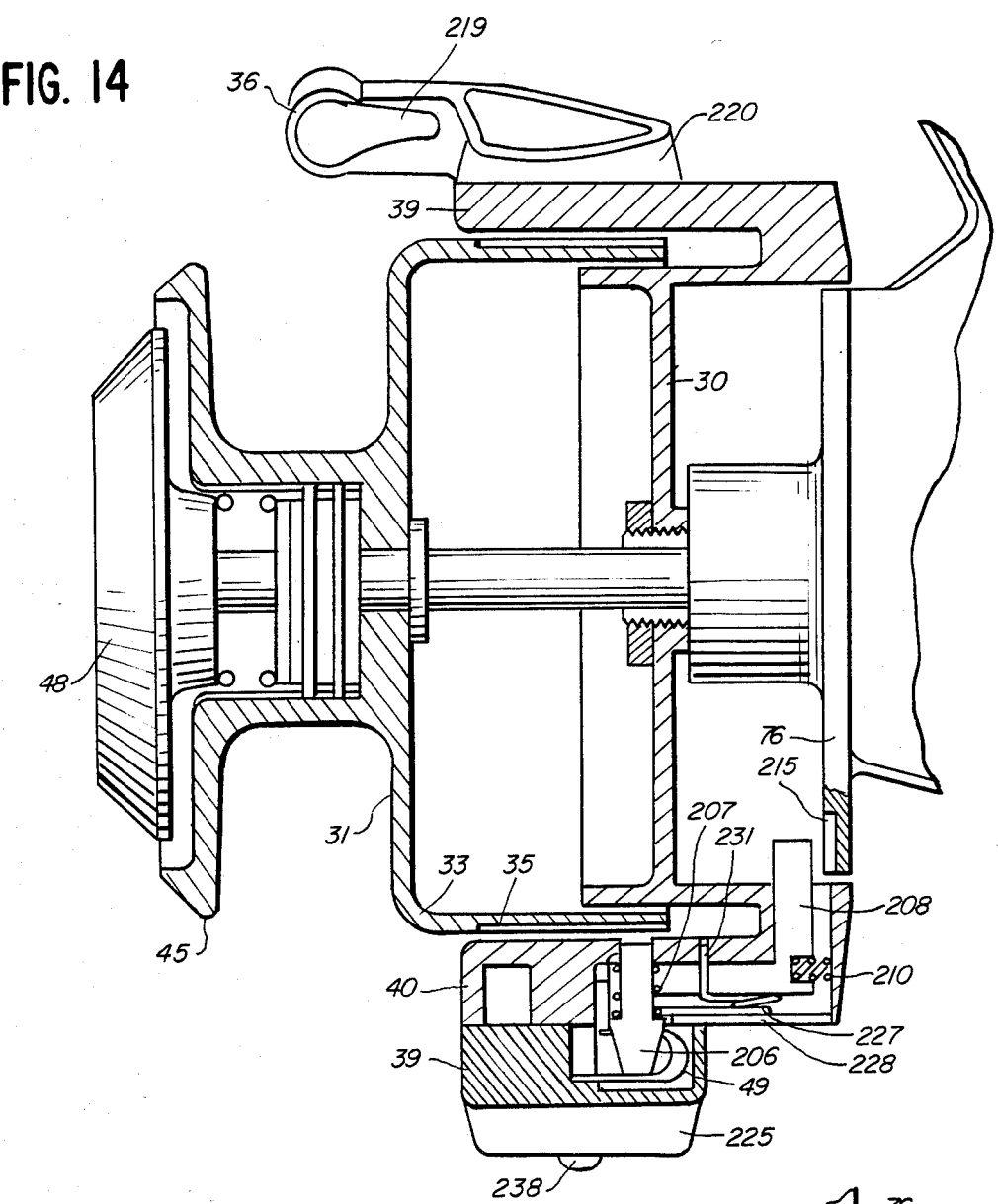
FIG. 14 is a partial cross-section view through the skirted spool of FIG. 13 showing the rotor and spool lock in position for normal retrieve mode.
FIG. 15 is a partial section view similar to FIG. 14 only showing the spool and rotor lock in the casting mode.

FIGS. 11 and 14 show the conditions in the normal retrieve mode (closed) during fishing. FIGS. 12 and 15 show the conditions in the casting mode (open).

In FIGS. 3 and 11 the bail attachment, normally called the bail hinge or bail arm 43, is attached to the rotor arm 40 of the rotor 30 and hinges or pivots about the bail hinge screw 38. A cam spring 49 is attached by a screw 203 to a surface 204 in the bail hinge 43. The cam spring 49 is contained within the confines of a cavity 205 in the bail hinge 43. A lock plunger 206 is guided in a pilot hole 200 in rotor arm 40 with the axis of the plunger 206 being radial to the rotor 30. A plunger spring 207 encircles the plunger 206 and bears between the rotor arm 40 and an enlargement on the plunger to urge the plunger radially outward relative to the rotor 30 and into contact with the cam spring 49. In the retrieve condition of FIG. 11, the spool lock plunger 206 is disengaged from the spool 31 by the force applied by plunger spring 207 on the plunger. The opposite end of the plunger 206 is urged against the low part of the cam spring 49 near the attachment of the cam spring to the bail hinge 43. A latch lever 208 is seated in a guide in the rotor arm 40, which guide extends transverse to the pilot hole 200. The one end of the latch lever 208 is bifurcated and straddles the lock plunger 206 with one leg of the bifurcated end engaging a trip cam surface 209 extending upwardly from the bail hinge 43 into overlapping relationship with the inside of the rotor arm 40. The latch lever 208 is pressed against the trip cam surface 209 by forces applied by the latch lever spring 210. The latch lever 208 has an upstanding ledge 214 which extends radially inward beyond the rotor arm 40 in axially overlapping relationship with the face of the flange 76 on the housing 21. When spring 210 urges the latch lever 208 against the trip cam surface 209 and when the bail is in the retrieve condition of FIG. 11, the ledge 214 is out of contact with the flange 76.

FIG. 12 shows the condition in the casting mode with the bail 34 open for casting. The bail hinge 43 is rotated and held in position by forces applied by the bail trip spring 211 by virtue of the attachment of the bail 34 to both the bail axle arm 42 and bail hinge 43. In the casting mode, cam spring 49 forces the spool lock plunger 206 against spring 207 to engage the plunger 206 with the slots 35 in the spool skirt 33. The plunger 206 locks the spool 31 to the rotor 30 preventing relative movement between the two. In addition, rotation of the bail hinge 43 to the open casting position also causes the hinge cam surface 209 to engage the end of the latch lever 208 and to force the ledge 214 on latch lever 208 into engagement with the flange 76 on the body 21. The rotor 30 and latched spool 31 are rotated relative to the flange 76 until the ledge 214 on latch lever 208 is forced into the index slot 215 in the peripheral face of flange 76. The flange 76 has the index slot 215 located relative to the rotor 30 such that when the ledge 214 of latch lever 208 engages in the index slot 215, the bail axle arm 42 to which the bail axle 212 and line roller 36 are anchored by screw 213 will be in a position for convenient line pickup by a finger for casting. The engagement of the ledge 214 of latch lever 208 in slot 215 in flange 76 prevents rotation of the rotor 30 and spool 31 during casting. Manually tripping the bail 34 for line pickup disengages latch lever 208 from the slot 215 in flange 76 and disengages the spool lock plunger 206 from the spool whereby the line can be wound on the spool by the crank 28 when desired.

Figure 13:
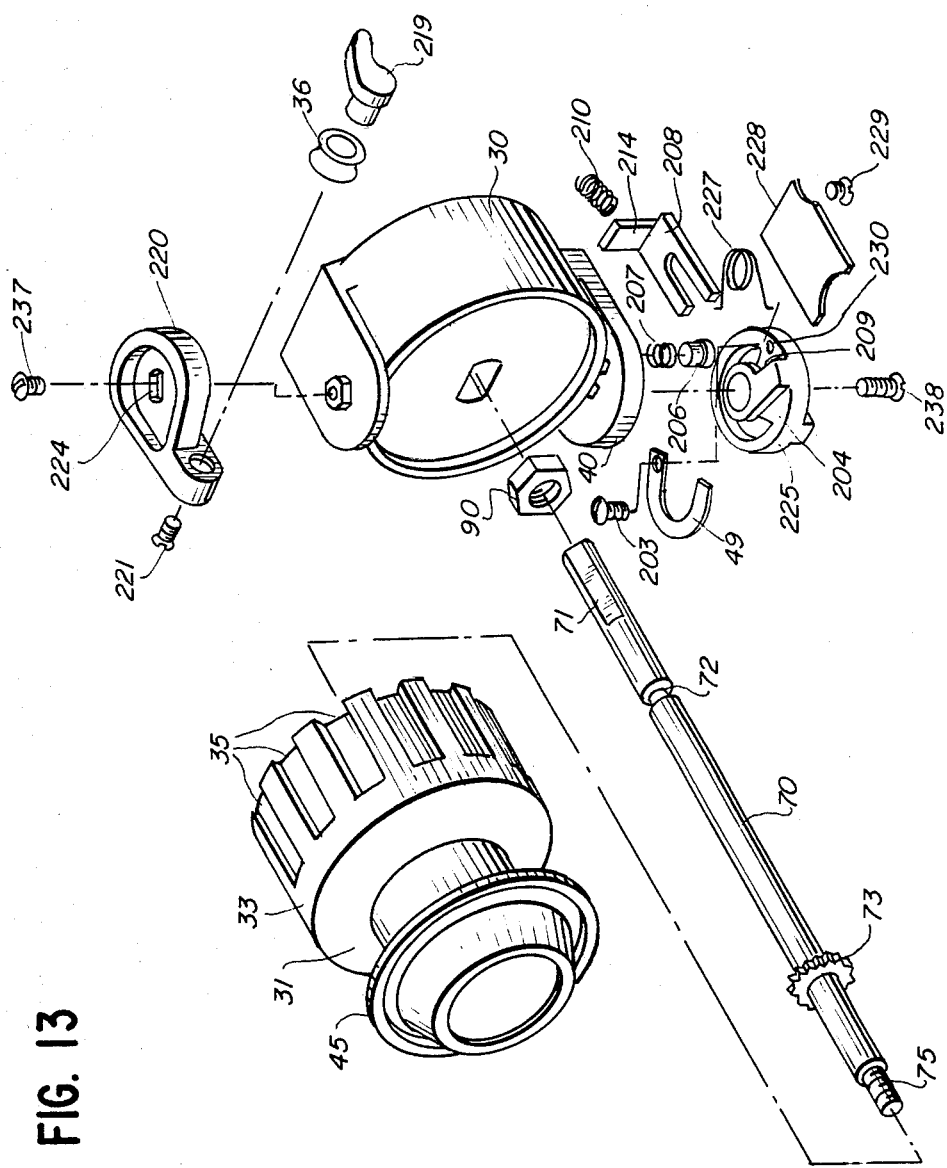
FIG. 13 is a partial exploded perspective view of a modified form of skirted style spinning reel having a bail-less manual line pickup and showing a modified form of spool and rotor lock arrangement.

The bail-less type reel shown in exploded view in FIG. 13 is shown in the retrieve mode in FIG. 14. In this configuration the line roller 36 is mounted on a pickup pin 219 and is secured to a pickup arm 220 by screw 221 which arm 220 is anchored to the rotor arm 39 on the rotor 30 by a screw 237. The rotor arm 39 has a boss with flats 223 matching a mounting hole 224 in the pickup arm 220 which prevents the pickup arm 220 from rotating relative to the rotor arm 39. Locking knob 225 is mounted on the second rotor arm 40 on the rotor and pivots about a hinge screw 238. Spool lock plunger 206 is mounted in rotor arm 40 and is retracted from the spool skirt 33 by spring 207 urging plunger 206 against the cam spring 49. At the same time, the ledge 214 of latch lever 208 is disengaged from the body flange 76 and index slot 215 by spring 210 urging the latch lever 208 against the trip cam 209. A hairpin type overcenter spring 227 has ends seated in anchor holes 230,231 and causes forces to be applied to the locking knob 225 preventing accidental tripping from one mode to the other. To move the reel to the casting mode shown in FIG. 15 the locking knob 225 is hand rotated causing the overcenter spring 227 to exert forces to hold the knob 225 in the latched position. Cover plate 228 is held in place by screw 229 and retains the latch lever 208 and the overcenter spring 227 in position in the rotor arm 40. With the knob 225 in the casting mode, the rotor 30 is free to rotate relative to the flange 76 on housing 21 with the spool restrained from rotating relative to the centershaft 70 by the drag assembly 44.

We claim:

1. In a spinning reel having a housing, a rotor carried by the housing, means for rotating the rotor, a centershaft extending from the housing and through the rotor, a spool on the outer end of the centershaft, means for oscillating the centershaft and spool relative to rotation of the rotor, drag means carried by the spool in operative engagement with the centershaft for applying drag to rotation of the spool relative to the centershaft, the improvement comprising:

A. locking means for locking the rotor to the spool and to the housing to prevent relative rotation therebetween including
  (a) plunger means carried by the rotor, means for urging the plunger means radially outward of the rotor;
  (b) latch means carried by the rotor and extending transverse to the plunger means, means for urging the latch means away from the housing;
  (c) means for moving the plunger means into locking engagement with the spool to prevent rotation of the spool relative to the rotor;
  (d) means for moving the latch means into locking engagement with the housing to prevent rotation of the rotor relative to the housing; and
  wherein the locking means is releasable by releasing the plunger means and latch means whereby the rotor will be free to rotate relative to the spool and to the housing.

2. In a spinning reel as claimed in claim 1 wherein the locking means includes means pivotally mounted on the rotor for movement between two fixed positions, and wherein the means for moving the plunger means and the means for moving the latch means are mounted on the pivotally mounted means whereby one position of the pivotally mounted means is the locked condition of the rotor and spool and the other position of the pivotally mounted means is the rotating condition of the rotor and spool.

3. In a spinning reel as claimed in claim 2 wherein the pivotally mounted means is a bail hinge supporting one end portion of a bail carried by the rotor, the one position of the bail of the pivotally mounted means is the open cast position of the bail and the other position of the bail of the pivotally mounted means is the closed retrieve position of the bail.

4. In a spinning reel as claimed in claim 2 wherein the pivotally mounted means is a locking knob pivotally mounted on the rotor between the locked condition of the rotor and spool and the rotatable condition of the rotor and spool.

5. In a spinning reel as claimed in claim 2 wherein the means on the pivotally mounted means for moving the plunger means is a cam-shaped member in alignment with the plunger means such that pivoting the pivotally mounted means moves the cam-shaped member in alignment with the plunger means so that in one direction the cam member moves the plunger means into contact with the spool to lock the spool to the rotor and in the other direction the urging of the plunger against the cam-shaped member retracts the plunger from the spool.

6. In a spinning reel as claimed in claim 2 wherein the means on the pivotally mounted means for moving the latch means into locking engagement with the reel housing is a trip cam surface which contacts with the latch means and moves the latch means into contact with the reel housing to lock the rotor to the housing.

7. In a spinning reel as claimed in claim 6 wherein an axially facing flange is fixed on the reel housing with an index slot formed in the flange, and wherein the latch means engages in the index slot when the rotor is oriented relative to the housing such that a guide roller on the rotor is positioned relative to the reel housing to facilitate finger guiding of the line during a cast.

8. In a spinning reel as claimed in claim 7 wherein the pivotally mounted means is a bail hinge supporting one end of a bail carried by the rotor, and wherein when the latch means engages with the index slot the bail is oriented with the guide roller in position to facilitate finger guiding the line during a cast.

9. In a spinning reel as claimed in claim 7 wherein the pivotally mounted means is a locking knob and wherein the guide roller on another bail arm is oriented to facilitate retrieving the line.

10. In a spinning reel as claimed in claim 1 wherein the spool has a skirt with parallel longitudinally oriented slots and wherein the plunger means engages in one of the slots to lock the spool to the rotor.

11. In a spinning reel having a housing, a rotor carried by the housing and having at least one rotor arm thereon, means for rotating the rotor, a centershaft extending from the housing and through the rotor, a spool on the outer end of the centershaft, means for oscillating the cetershaft and spool relative to rotation of the rotor, drag means carried by the spool in operative engagement with the centershaft for applying drag to rotation of the spool relative to the centershaft, the improvement comprising:

locking means for locking the rotor to the spool and to the housing to prevent rotation therebetween, the locking means being mounted on the rotor arm on the rotor including;

plunger means carried by the rotor, means for urging the plunger means radially outward of the rotor;

latch means carried by the rotor arm and extending transverse to the plunger means, means for urging the latch means away from the housing;

means for moving the plunger means into locking engagement with the spool to prevent rotation of the spool relative to the rotor;

means for moving the latch means into locking engagement with the reel housing to prevent rotation of the rotor relative to the reel housing; and wherein the locking means is releasable by releasing the plunger means and latch means whereby the rotor will be free to rotate relative to the spool and to the reel housing.

12. In a spinning reel having a housing, a rotor carried by the housing and having a pair of rotor arms thereon, means for rotating the rotor, a centershaft extending through the rotor and through the housing, a spool on the centershaft, means for oscillating the centershaft and spool relative to rotation of the rotor, drag means carried by the spool in operative engagement with the centershaft for applying drag to rotation of the spool relative to the centershaft, the improvement characterized by:

plunger means carried by one of the rotor arms;

means for urging the plunger means radially outward of the rotor;

latch means carried by the same rotor arm and extending transverse to the plunger means;

means on the rotor for urging the latch means away from the housing;

means for moving the plunger means radially inward of the rotor into locking engagement with the spool to prevent rotation of the spool relative to the rotor;

means for moving the latch means into locking engagement with the reel housing to prevent rotation of the rotor relative to the reel housing; and means for releasing the plunger means and the latch means whereby the rotor will be free to rotate relative to the spool and to the reel housing.

13. In a spinning reel used for casting a bait attached to a fishing line and for retrieving the bait and fishing line after casting;

the reel having a housing with a forward spool end portion, a back end portion and a centershaft extending through the housing and projecting rearward into a cavity on the back end portion, a keyed portion on the centershaft extending into the cavity;

a spool carried by the forward portion of the centershaft;

a front drag acting between the spool and the centershaft to resist rotation between the spool and the centershaft;

a handcrank;

a rotatably mounted rotor connected by a transmission means to the handcrank to be rotated thereby;

an anti-reverse means carried by the housing and selectively engageable with the transmission means to prevent the rotor from being rotated in a reverse direction, the improvement comprising:

a rear drag mounted in the cavity and operatively engaging the centershaft, the rear drag comprising:

(a) drag driver means rotatably mounted in the cavity and keyed to the keyed portion of the centershaft;

(b) means acting between the drag driver means and the cavity walls for applying a drag on the centershaft;

(c) a ratchet wheel keyed to a keyed portion of the drag driver means;

(d) click means carried by the housing and having a portion engaging with the ratchet wheel to audibly signal rotation of the ratchet wheel when the line pull on the spool exceeds the drag of the rear drag; and (e) means carried by the housing and selectively contacting the ratchet wheel for locking the ratchet wheel, drag driver means and centershaft against rotation.

14. A spinning reel as claimed in claim 13 wherein the anti-reverse means is in operative engagement with a stop in the transmission means when the means for locking the ratchet wheel, drag driver means and centershaft is inoperative.

15. A spinning reel as claimed in claim 14 wherein the means for locking the ratchet wheel, drag driver means and centershaft comprises a plunger bolt carried by the housing for movement in a radial direction from the ratchet wheel, means for urging the plunger bolt into contact with the ratchet wheel for locking the ratchet wheel against rotation and means for moving the plunger bolt out of contact with the ratchet wheel whereby the ratchet wheel and drag driver means are rotatable relative to the centershaft when the drag of the rear drag is exceeded.

16. A spinning reel as claimed in claim 15 wherein the means for moving the plunger bolt out of contact with the ratchet wheel comprises a cam follower carried by the plunger bolt, a cam surface carried by the housing in alignment with the cam follower and handle means on the plunger bolt for rotating the plunger bolt to traverse the cam follower over the cam surface to raise the plunger bolt from the ratchet wheel.

17. A spinning reel as claimed in claim 15 wherein the means for moving the plunger bolt comprises a rod means extending transverse to the axis of the plunger bolt, cam means on the rod means engaging with a cam means on the plunger bolt, and a handle exterior of the housing and lying parallel to the rod means and being connected to the rod means, whereby rotating the rod means by the handle raises the plunger bolt out of contact with the ratchet wheel.

18. A spinning reel as claimed in claim 17 wherein the rod means has three flats located 90° apart around its periphery, spring means carried by the housing in engagement with one of the flats, the middle flat when engaged by the spring means is oriented on the rod relative to the cam means such that the cam means will hold the plunger bolt in contact with the ratchet wheel and the handle will be centered on the housing, and the other two flats, when selectively engaged by the spring means, are oriented relative to the cam means such that when engaged the plunger bolt will be raised from contact with the ratchet wheel and the rear drag means and click means will be operative.

19. In a spinning reel having a housing with a forward end, a back end and a centershaft extending through the housing and projecting forward of the forward end and projecting rearward into a rearward facing boss on the back end, a keyed portion on the centershaft extending into the rearward facing boss;
a rotor rotatably carried by the housing;
a spool carried by the forward projecting portion of the centershaft in close proximity to the rotor;
a front drag acting between the spool and the centershaft to resist rotation between the spool and the centershaft;
an anti-reverse assembly carried by the housing and being selectively actuated for preventing reverse rotation of the rotor, the improvement comprising:
a rear drag mounted in the boss on the back end of the reel and operatively engaging the centershaft, the rear drag comprising:
 (a) drag driver means rotatably mounted in the boss and keyed to the keyed portion of the centershaft;
 (b) means acting between the drag driver means and the boss for applying a drag on the centershaft;
 (c) a ratchet wheel keyed to a keyed portion of the drag driver means;
first locking means for locking the ratchet wheel, drag driver means and centershaft against rotation;
actuator knob means for actuating the first locking means for selectively engaging and disengaging the ratchet wheel;
second locking means for locking the spool and rotor against rotation relative to the housing including a plunger means on the rotor;
means for urging the plunger means away from the spool;
latch means on the rotor extending transverse to the plunger means;
means for urging the latch means away from the reel housing;
means for moving the plunger means into engagement with the spool to prevent rotation of the spool relative to the rotor;
means for moving the latch means into engagement with the reel housing to prevent rotation of the rotor relative to the reel housing; and
wherein the second locking means is releasable by releasing the plunger means and the latch means whereby the rotor will be free to rotate relative to the spool and to the reel housing.

20. In a spinning reel having a housing with a forward end, a back end and a centershaft extending through the housing and projecting forward of the forward end and projecting rearward into a rearward facing cavity on the back end, a keyed portion on the centershaft extending into the rearward facing cavity;
a spool carried by the forward projecting portion of the centershaft;
a front drag acting between the spool and the centershaft to resist rotation between the spool and the centershaft;
a handcrank;
a rotatably mounted rotor connected by a transmission means to the handcrank to be rotated thereby, at least one rotor arm carried by the rotor;
an anti-reverse assembly carried by the housing and being selectively actuated for preventing reverse rotation of the rotor, the improvement comprising:
a rear drag mounted in the cavity on the back of the housing and operatively engaging the centershaft, the rear drag comprising:
 drag driver means rotatably mounted in the cavity and keyed to the keyed portion of the centershaft;
 means acting between the drag driver means and the walls of the cavity for applying a drag on the centershaft;
 a ratchet wheel keyed to a keyed portion of the drag driver means;
 click means carried by the housing in engagement with the ratchet wheel to audibly signal rotation of the ratchet wheel when the line pull on the spool exceeds the drag of the rear drag;
means for locking the ratchet wheel, drag driver means and centershaft against rotation, including;
a first plunger means engageable with the ratchet wheel;
means for actuating the first plunger means for selectively engaging and disengaging the ratchet wheel;
locking means for locking the spool and the rotor against relative rotation, the locking means comprising a second plunger means on the rotor arm, means for urging the second plunger means radially outward of the rotor;
latch means on the rotor arm extending transverse to the second plunger means, means for urging the latch means away from the housing;
means for moving the second plunger means radially inward of the rotor into locking engagement with the spool to prevent rotation of the spool relative to the rotor;
means for moving the latch means into locking engagement with the reel housing to prevent rotation of the rotor relative to the reel housing; and
wherein the locking means is releasable by releasing the second plunger means and the latch means whereby the rotor will be free to rotate relative to the spool and to the reel housing.

* * * * *